United States Patent Office 2,968,657
Patented Jan. 17, 1961

2,968,657

PROCESS FOR PREPARING ALKENYL OXAZINES

Milton A. Perry, Longview, Tex., Joseph B. Dickey, Kingsport, Tenn., and Alfred G. Robinson III, Longview, Tex., assignors to Eastman Kodak Company, Rochester, N.Y., a corporation of New Jersey No Drawing. Filed May 22, 1959, Ser. No. 814,958

6 Claims. (Cl. 260—244)

This invention relates to the preparation of alkenyl oxazines which are valuable intermediates in the manufacture of resinous polymers that find utility as fiber-and-film-forming materials and as molding compositions.

It is known that alkenyl oxazines can be prepared by heating acrylic or methacrylic esters with certain amino-alcohols wherein the amino group is bonded to a tertiary carbon atom in the 2- or 3-position of the chain. However, the reaction involves a complicated series of side reactions and requires elevated temperatures and specific metal alkoxides as catalysts. Also, the elevated temperatures tend to favor polymerization of the product so that polymerization inhibitors are required to promote better yields. Accordingly, the above process has not proven satisfactory for commercial production of the desired alkenyl oxazines. It is also known that dihydro-1,3-oxazines can be prepared by reacting saturated nitriles with certain dihydric alcohols. For example, E. J. Tillmans and J. J. Ritter in Journal of Organic Chemistry, 22, pages 839-840 (1957), describe the reaction of acetonitrile, benzonitrile and phenylacetonitrile with 2-methyl-2,4-pentanediol to give instead of the expected diamides the oxazine compounds 2,4,4,6-tetramethyl-5,6-dihydro-1,5-oxazine, 4,4,6-trimethyl-2-phenyl-5,6-dihydro-1,3-oxazine and 4,4,6 - trimethyl-2-benzyl-5,6-dihydro-1,3-oxazine, respectively.

We have now found that unsaturated nitriles such as acrylonitrile, methacrylonitrile, crotonitrile, etc., contrary to the teachings of the prior art that cyanoalkylation would be expected (see, for example, H. A. Bruson, U.S. Patent 2,401,607, dated June 4, 1946), react with trimethylene oxide or its substituted derivatives, in the presence of concentrated sulfuric acid, to give the corresponding unsaturated or alkenyl oxazines, the unsaturated group of the starting nitrile remaining unexpectedly intact in the reaction. Also, since the reaction is carried out at relatively low reaction temperatures little, if any, polymerization of the alkenyl oxazine products occurs so that good yields of the product are obtained. Since the reactants are cheap and readily available, an economical process is thus provided.

It is, accordingly, an object of the invention to provide a new process for the preparation of alkenyl oxazines. Another object is to provide useful products derived therefrom. Other objects will become apparent from a reading of the description and examples.

In accordance with the invention, we prepare the alkenyl oxazines by reacting (1) an α,β-unsaturated nitrile represented by the following general formula:

(I) 

wherein R represents an atom of hydrogen or a methyl group and $R_1$ represents an atom of hydrogen, a halogen atom such as chlorine, bromine or fluorine, a methyl group or a cyano group, with (2) trimethylene oxide or a substituted derivative thereof, e.g. (a) an oxetane represented by the following general formula:

(II) 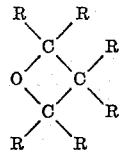

wherein each R is as above defined, or (b) a 1,3- or 2,4-alkanediol represented by the following general formula:

(III) 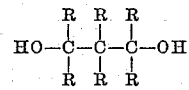

wherein each R is as above defined, or with (3) diacetone alcohol, in the presence of strong or concentrated sulfuric acid (i.e. containing 90% or more of $H_2SO_4$). Advantageously, the unsaturated nitrile is first added to the concentrated sulfuric acid, preferably very slowly as in dropwise addition, while stirring and maintaining the temperature of the reaction mixture at about from 5–40° C., and after the addition is complete, then adding in similar gradual manner the oxetane represented by above Formula II, or the alkanediol represented by above Formula III, or the diacetone alcohol, and on completion of this reaction pouring the mixture onto crushed ice, neutralizing with strong aqueous caustic solution, for example, 40% sodium hydroxide and then recovering the alkenyl oxazine product by conventional separation methods, for example, by extraction with ether and fractional distillation of this extract. The process employing the alkanediols is preferred. It is also possible to first mix the illustrated nitrile and the oxetane or alcohol reactants and then slowly add this mixture to the sulfuric acid, the resulting reaction mixture being subsequently treated as mentioned above. The proportions of the reactants can be varied to some extent, for example, employing a substantial excess of the unsaturated nitrile, but advantageously approximately equimolar proportions of the unsaturated nitrile and the oxetane or the alkanediol are employed. The amount of sulfuric acid employed can vary from about 1–10 moles, or even more, but preferably from 2–5 moles per mole of the oxetane or alcohol reactant.

The alkenyl oxazines of the invention, prepared with the oxetones and alkanediols, are in the dihydro form and represented by the following general formula:

(IV) 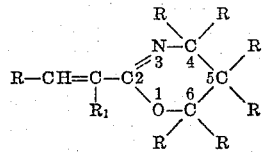

whereas the alkenyl oxazines prepared with diacetone alcohol are in the unsaturated form and represented by the following general formula:

(V) 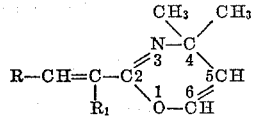

wherein in each of above Formulas IV and V, R and $R_1$ are as previously defined. Suitable α,β-unsaturated nitriles for preparing the above defined alkenyl oxazines include acrylonitrile, methacrylonitrile, α-chloroacrylonitrile, α-bromoacrylonitrile, α-fluoroacrylonitrile, crotonitrile, α-chlorocrotonitrile, methylene malononitrile, and similar compounds. Suitable oxetanes include trimethylene oxide, 1,3 - epoxy-2-methylpropane, 1,3 - epoxy-2-ethylpropane, 1,3-epoxy-3,3-dimethylpropane, 1,3-epoxy-2,2-diethylpropane, 1,3 - epoxy - 2,2 - dimethylpropane, 1,3-epoxy butane, 1,3 - epoxy-3-methylbutane, 1,3-epoxy-3-ethylpentane, 1,3 - epoxy-2,2,4 - trimethylpentane, 3-hydroxymethyl - 3 - methyloxetane, 3,3-bis-(chloromethyl) oxetane, 3,3-bis (bromomethyl) oxetane, etc. Suitable 1,3- and 2,4 - alkanediols include 2-methyl - 1,3-propanediol, 2 - ethyl-1,3-propanediol, 2-propyl-1,3-propanediol, 2-butyl - 1,3-propanediol, 2,2-dimethyl-1,3-propanediol, 2,2-dibutyl - 1,3 - propanediol, 2-ethyl-2-isopropyl-1,3-propanediol, 1,3 - butanediol, 2-methyl-1,3-butanediol, 2-butyl - 1,3 - butanediol, 2,3-dimethyl-1,3-butanediol, 1,3-pentanediol, 2 - methyl - 1,3-pentanediol, 2-methyl-2,4-pentanediol, 2,4 - dimethyl - 2,4 - pentanediol, 2,2,4-trimethyl - 1,3 - pentanediol, 2,2,4-trimethyl - 2,4-pentanediol, 2,3,3,4-tetramethyl-2,4-pentanediol, and the like.

The following examples will serve to illustrate further our process for preparing the alkenyl oxazines of the invention.

Example 1

Five moles (510 g.) of sulfuric acid was cooled to 8° C. To the acid with stirring was added dropwise 132 g. (2.49 moles) of acrylonitrile while maintaining the temperature at 8–10° C. After addition was complete, 293 g. (2.48 moles) of 2-methyl-2,4-pentanediol was added over a period of three hours. The mixture was stirred an additional hour at 8° and poured into a kilogram of ice. The acid was partially neutralized with 203 g. of NaOH (as 40% solution) and extracted with chloroform three times. The aqueous layer was then completely neutralized to litmus and extracted with diethyl ether. The ether extract was removed, dried and distilled to give 210 g. (55%) of 4,4,6-trimethyl-2-vinyl-5,6 - dihydro - 1,3,4-oxazine, B.P. 47–49° C. at 3 mm. Five grams of this material was treated with 0.5% benzoyl peroxide at 85° C. to give a clear solid polymer.

Example 2

A mixture consisting of 117 g. (1.36 moles) of 3,3-dimethyloxetane and 144 g. (2.72 moles) of acrylonitrile was added dropwise to 303 g. (3 moles) of sulfuric acid maintained at 30–35° C. After 15 minutes of stirring, after the addition was complete, the mixture was poured into 3 kilograms of ice. The mixture was neutralized with sodium hydroxide and extracted with ether. The ether extract was dried and distilled to give 81 g. (35%) of 5,5 - dimethyl-2-vinyl-5,6-dihydro-1,3,4-oxazine, B.P. 39° C. at 1.5 mm.

Example 3

To 505 g. (5 moles) of concentrated $H_2SO_4$ was added with stirring 134 g. (2 moles) of methacrylonitrile maintaining a temperature of 30–35° C. After addition of the nitrile was complete, 168 g. (2 moles) of 3,3-dimethyloxetane was added dropwise while maintaining a reaction temperature of 30–35° C. After addition was complete, the reaction mixture was stirred at 30° C. for one hour and then poured into 3 kilograms of ice. The mixture was made just alkaline to litmus and then extracted with three 500-ml. portions of ether. After drying over sodium sulfate, the ether was removed by distillation. The residue was distilled to give 92 g. (30% conversion) of 2-isopropenyl-5,5-dimethyl-5,6-dihydro-1,3,4 - oxazine, B.P. 34–36° C. at 3 mm., $n_D^{20}$ 1.4667.

Example 4

To 505 g. (5 moles) of concentrated $H_2SO_4$ was added with stirring 134 g. (2 moles) of crotononitrile maintaining a temperature of 30–35° C. After addition of the nitrile was complete, 168 g. (2 moles) of 3,3-dimethyloxetane was added dropwise while maintaining a reaction temperature of 30–35° C. After addition was complete, the reaction mixture was stirred at 30° C. for one hour and then poured into 3 kilograms of ice. The mixture was made just alkaline to litmus and extracted with three 500-ml. portions of ether. After drying and ether removal, distillation of the residue gave 156 g. (51% conversion) of 2-propenyl-5,5-dimethyl-5,6-dihydro-1,3,4-oxazine, B.P. 37–38° C. at 2.5 mm., $n_D^{20}$ 1.4657.

Example 5

To 505 g. (5 moles) of concentrated $H_2SO_4$ was added with stirring 134 g. of crotononitrile maintaining a temperature of 10–15° C. After addition of the nitrile was complete, 236 g. (2 moles) of 2-methyl-2,4-pentanediol was added dropwise maintaining a reaction temperature of 10° C. The reaction was stirred for one hour after addition was complete and then poured into 3 kilograms of ice. Sufficient base was added to half-neutralize the sulfuric acid. The mixture was extracted twice with 500-ml. portions of chloroform. The aqueous layer was then made alkaline to litmus and extracted with three 500-ml. portions of ether. After drying and ether removal, distillation of the residue gave 219 g. (65% conversion) of 2-propenyl-4,4,6-trimethyl-5,6-dihydro-1,3,4-oxazine, B.P. 41–43° C. at 2 mm., $n_D^{20}$ 1.4643.

Example 6

To 505 g. (5 moles) of concentrated $H_2SO_4$ was added with stirring 106 g. (2 moles) of acrylonitrile, maintaining a temperature of 10–15° C. After addition of the nitrile was complete, 232 g. (2 moles) of diacetone alcohol was added dropwise maintaining a reaction temperature of 10° C. The reaction was stirred for one hour after addition was complete and then poured into 3 kilograms of ice. Sufficient base to half-neutralize the sulfuric acid was added. The mixture was extracted twice with 500-ml. portions of chloroform. The aqueous layer was then made alkaline to litmus and extracted with three 500-ml. portions of ether. After drying and ether removal distillation of the residue gave 142 g. (47% conversion) of 4,4,6-trimethyl-2-vinyl-1,3,4-oxazine, B.P. 47° C. at 1.5 mm., $n_D^{20}$ 1.4713.

Example 7

To 505 g. (5 moles) of concentrated $H_2SO_4$ was added with stirring 134 g. (2 moles) of methacrylonitrile, maintaining a temperature of 10–15° C. After addition of the nitrile was complete, 232 g. (2 moles) of diacetone alcohol was added dropwise keeping a reaction temperature of 10° C. The reaction was stirred for one hour after addition was complete and then poured into 3 kilograms of ice. Sufficient base was added to half-neutralize the sulfuric acid. The mixture was extracted twice with 500-ml. portions of chloroform. The aqueous layer was then made alkaline to litmus and extracted with three 500-ml. portions of ether. After drying and ether removal, distillation of the residue gave 102 g. (30% conversion) of 4,4,6-trimethyl-2-isopropenyl - 1,3,4-oxazine, B.P. 52° C. at 3 mm., $n_D^{20}$ 1.4698.

Example 8

To 505 g. (5 moles) of concentrated $H_2SO_4$ was added with stirring 134 g. (2 moles) of methacrylonitrile maintaining a temperature of 30–35° C. After this addition was complete, 237 g. (2 moles) of 3,3-bis(chloromethyl)oxetane was added dropwise with stirring maintaining the temperature at 30–35°. After addition was complete, the reaction mixture was stirred at 30° C. for one hour and poured on ice. Working the product up as in Example 3 gave 23% conversion to 2-isopropenyl-5,5-bis(chloromethyl)-5,6 - dihydro - 1,3,4 - oxazine, B.P. 58°–60° at 5 mm. Similarly 2-isopropenyl-5-hydroxymethyl-5-methyl-5,6-dihydro-1,3,4-oxazine is made from methacrylonitrile and 3-hydroxymethyl-3-methyloxetane.

Example 9

α-Chloroacrylonitrile and 2 - methyl - 2,4 - pentanediol were reacted as in Example 1. The product 4,4,6-trimethyl-2-(1-chlorovinyl)-5,6-dihydro - 1,3,4 - oxazine was obtained, B.P. 52–53° at 3 mm. in 12% conversion. Similarly a 10% conversion of methylenemalonitrile to 4,4,6-trimethyl-2-(1-cyanovinyl)-5,6-dihydro - 1,3,4 - oxazine was obtained.

By proceeding in the manner described in the above examples, other alkenyl oxazines coming within general Formula IV can be prepared with any combination of the mentioned α,β-unsaturated nitriles and trimethylene oxide and derivatives thereof. While the preceding examples illustrate just batch processes, it will be understood that continuous and semi-continuous can also be employed. All of the alkenyl oxazines of the invention, as previously indicated, are readily homopolymerizable or copolymerizable by conventional methods of addition polymerization to high molecular weight, resinous polymers, for example, polyvinyloxazine, poly-4,4,6-trimethyl-2-vinyl-5,6-dihydro-1,3,4-oxazine, poly-4,4,6-trimethyl-2-isopropenyl-5,6-dihydro-1,3,4-oxazine, copolymers of 4,4,6-trimethyl-2-vinyl (or 2-isopropenyl)-5,6-dihydro-1,3,4-oxazine with acrylonitrile, vinyl acetate, methyl methacrylate, vinyl chloride, vinylidene chloride, acrylamide, ethylene, etc., graft copolymers of, for example, the above mentioned polymers with acrylonitrile, block copolymers of, for example, the above mentioned polymers with vinylidene chloride, and the like. The polymers have relatively high melting points (195–235° C.) and are particularly useful for preparing clear, transparent films, tubes, sheets, etc., and capable also of being drawn into fibers having excellent physical characteristics. Such resinous products are also useful for preparing stable shaped articles by compression and injection molding techniques. In addition, the alkenyl oxazines are useful for preparing graft and block type copolymers, and more particularly those wherein monomeric acrylonitrile is grafted onto a preformed alkenyl oxazine homopolymer or copolymer. The films and sheets are particularly useful as photographic film supports. If desired, the polymer compositions mentioned above may be modified by incorporating therein various fillers, dyes, pigments, lubricants, plasticizers, and the like.

The invention has been described in detail with particular reference to preferred embodiments thereof, but it will be understood that variations and modifications can be effected within the spirit and scope of the invention as described herein above and as defined in the appended claims.

What we claim is:
1. A process for preparing an alkenyl oxazine represented by the following general formula:

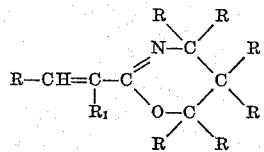

wherein each R represents a member selected from the group consisting of an atom of hydrogen and a methyl group and $R_1$ represents a member selected from the group consisting of an atom of hydrogen, an atom of chlorine, a methyl group, and a cyano group, which comprises contacting approximately equimolar quantities of (1) an α,β-unsaturated nitrile represented by the following general formula:

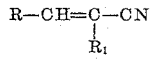

wherein R and $R_1$ are as above defined, with (2) a compound selected from the group consisting of (a) an oxetane represented by the following general formula:

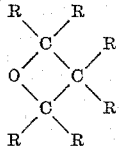

wherein each R is as above defined, and (b) an alkanediol represented by the following general formula:

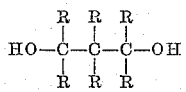

wherein each R is as above defined, at from 5–40° C., in the presence of concentrated sulfuric acid, and separating the said alkenyl oxazine which forms from the reaction mixture.

2. The process for preparing 4,4,6-trimethyl-2-vinyl-5,6-dihydro-1,3,4-oxazine according to claim 1 wherein said (1) is acrylonitrile and said (2) is 2-methyl-2,4-pentanediol.

3. The process for preparing 5,5-dimethyl-2-vinyl-5,6-dihydro-1,3,4-oxazine according to claim 1 wherein said (1) is acrylonitrile and said (2) is 3,3-dimethyloxetane.

4. The process for preparing 2 - isopropenyl - 5,5 - dimethyl-5,6-dihydro-1,3,4-oxazine according to claim 1 wherein said (1) is methacrylonitrile and said (2) is 3,3-dimethyloxetane.

5. The process for preparing 2 - propenyl - 4,4,6 - trimethyl-5,6-dihydro - 1,3,4 - oxazine according to claim 1 wherein said (1) is crotonitrile and said (2) is 2-methyl-2,4-pentanediol.

6. The process for preparing 4,4,6-trimethyl-2-(1-chlorovinyl)-5,6-dihydro-1,3,4-oxazine according to claim 1 wherein said (1) is α-chloroacrylonitrile and said (2) is 2-methyl-2,4-pentanediol.

References Cited in the file of this patent
Tillmanns et al.: J. Org. Chem., vol. 22 (1957), p. 839.